United States Patent
Pettitt, Jr.

(10) Patent No.: US 8,297,964 B2
(45) Date of Patent: Oct. 30, 2012

(54) CLEANING OF EXTRUSION DIES

(75) Inventor: Delmer Ray Pettitt, Jr., Elkton, MD (US)

(73) Assignee: E I Du Pont de Nemours and Company, Wilmigton, DE (US)

( * ) Notice: Subject to any disclaimer, the term of this patent is extended or adjusted under 35 U.S.C. 154(b) by 234 days.

(21) Appl. No.: 11/975,415

(22) Filed: Oct. 19, 2007

(65) Prior Publication Data

US 2008/0099940 A1     May 1, 2008

Related U.S. Application Data

(60) Provisional application No. 60/853,923, filed on Oct. 24, 2006.

(51) Int. Cl.
    *B28B 13/00* (2006.01)
(52) U.S. Cl. ........ 425/229; 425/225; 425/226; 425/227; 264/141; 264/142; 264/176.1
(58) Field of Classification Search .................. 425/381, 425/155, 225–232, 311; 264/39, 141, 142, 264/176.1
    See application file for complete search history.

(56) References Cited

U.S. PATENT DOCUMENTS

| | | |
|---|---|---|
| 6,164,948 A | 12/2000 | Cook |
| 7,074,030 B2 * | 7/2006 | Ulcej et al. .................... 425/226 |

FOREIGN PATENT DOCUMENTS

| | | | |
|---|---|---|---|
| EP | 1 400 336 A | | 3/2004 |
| WO | WO 2004/039553 | * | 5/2004 |

OTHER PUBLICATIONS

Derwent Publications Ltd., JP 08 150651, Jun. 11, 1996.
Derwent Publications Ltd., JP 200 025089, Jan. 25, 2000.
Derwent Publications Ltd., JP 10 024481, Jan. 27, 1998.
International Preliminary Report on Patentability, issued by EPO as IPEA in the corresponding PCT application, dated May 7, 2009.

* cited by examiner

*Primary Examiner* — Christina Johnson
*Assistant Examiner* — Saeed Huda
(74) *Attorney, Agent, or Firm* — Loretta Smith; Otha Weaver

(57) ABSTRACT

Extrusion dies may be cleaned, especially of so-called die drips, by passing a wire over the die orifices in the vicinity of the exit face of the extrusion die. The operation of the extrusion operation is not affected by the passing of the wire through the stream(s) of the extrudate, and so the extrusion operation need not be shut down for the cleaning process. The process is especially useful for cleaning dies through which polymers are extruded.

20 Claims, 1 Drawing Sheet

CLEANING OF EXTRUSION DIES

CROSS REFERENCE TO RELATED APPLICATIONS

This application claims the benefit of U.S. Provisional Application No. 60/853,923, filed Oct. 24, 2006.

FIELD OF THE INVENTION

Polymer which has adhered to the face of a die while being extruded is removed from the face of the die without downtime by moving a relatively thin wire or wire-like part across the face of the die to remove built-up polymer.

TECHNICAL BACKGROUND

Thermoplastic polymers are important items of commerce, millions of tons being produced annually. Typically they are processed and/or formed into useful shapes by melting the polymer and then allowing it to cool to solidify. This is often called melt processing. One important method of melt processing is extrusion in which the polymer is melted and then pushed through a die having one or more orifices having a particular shape. After exiting the die the molten polymer is cooled and solidified. Among the items which can be made in this fashion are strands (which may be cut into pellets), rods, bars and other (sometimes more complex) profile shapes, fibers, and films.

A common problem in extrusion is the sticking of small amounts of the polymer being extruded to the edges of the die where the polymer exits the die, this edge sometimes being called the die lip (see for instance U.S. Pat. No. 6,164,948). As this polymer builds up the polymer furthest from the die surface is thermally insulated from the (usually) hot die and often solidifies. This buildup is called by numerous names, such as die drips, die drool, die lip buildup, etc., and may be referred to herein by any of these names. This buildup is deleterious because the heated die may cause the polymer to degrade, and/or the polymer buildup typically often contacts and adheres to (thus breaking away from the die surface) the molten polymer stream being extruded and may cause a defect in the extrusion being produced and/or contaminate the extrudate with degraded polymer.

Many methods have been tried to minimize this buildup (see U.S. Pat. No. 6,164,948 and references cited therein), since cleaning of the die face typically causes a shutdown in production, or at least a pause in production, of quality extrusion, usually with a concomitant loss of polymer, which typically becomes scrap. Therefore methods for cleaning of extrusion dies without loss of production are sought.

SUMMARY OF THE INVENTION

This invention concerns a process for cleaning an extruder die, comprising, moving a wire across the exit face and one or more extrusion orifices of said die in the vicinity of said exit face.

This invention also concerns a process for the extrusion of a polymer using an extruder having a die which has an exit face and one or more extrusion orifices, wherein the improvement comprises, moving a wire across said exit face and one or more said extrusion orifices of said die in the vicinity of said exit face.

Also described herein is an apparatus, comprising, an extruder having a die which has an exit face and one or more extrusion orifices, and a wire which is moved across said exit face and one or more said extrusion orifices of said die in the vicinity of said exit face.

BRIEF DESCRIPTION OF THE DRAWINGS

FIG. 1 is before the wire enters the thermoplastic,

FIG. 2 shows the wire in the thermoplastic flow, and

FIG. 3 shows the wire after it has exited the thermoplastic flow.

DETAILS OF THE INVENTION

Figure 1:
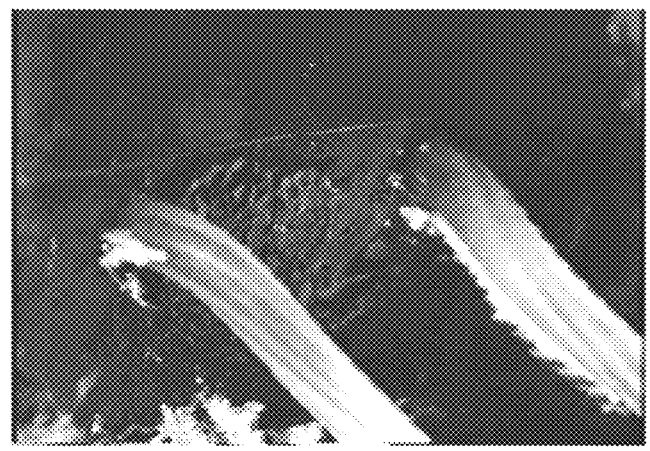
FIGS. 1-3, which are pictures show three stages of a wire being drawn through a molten thermoplastic extrudate as it is extruded through a die, as done in Example 1.

Herein certain terms are used and they are defined below:

By a wire is meant a relatively rigid (When in position to be used—the wire itself may not be rigid but in use it is. For example it may be held rigid in a frame.) thin elongated object whose preferred maximum thickness at a right angle to the extrudate's flow direction and at a right angle to the wire's long axis is no more than 20% of the maximum dimension of the extrudate cross section, or less than about 0.50 mm, whichever is smaller. More preferably the wire is less than about 0.25 mm, especially preferably less than about 0.15 mm thick, or less than 10%, and very preferably less than about 5% of the maximum dimension of the extrudate cross section, whichever is smaller. Thus a wire may, for instance, have a circular cross section (which is preferred), a square cross section, or have a ribbon (rectangular or oval for instance) shape where preferably the large dimension of the cross section of the ribbon is parallel to the extrudate flow.

By "in the vicinity of the exit face" is meant that wire is close enough to the surface of the exit face to dislodge from the exit face objectionable amounts of extrudate (die drips) which have stuck to the exit face. Alternatively it also means the wire may be in contact with the exit face across all or part of the exit face.

By "exit face" is meant the surface of the extrusion die through which the extrudate exits the die.

By "extrusion orifices" is meant one or more holes through which the extrudate flow through and out from the die.

By "across the exit face of the die" or "across the orifices" is meant the wire is moved in a direction substantially parallel to the exit face, such that "die drips" on the exit face of the die, especially in the vicinity of the extrusion orifices, are dislodged. This is preferably done when the die is in place (mounted) on an extruder as it would be when the extruder is in operation and/or preferably done while the extruder is in operation, i.e., extruding something.

The wire may be made of any material that is suitable to survive the conditions to which the wire is subjected. For instance the wire should have enough tensile strength so that it does not break easily in normal use, have a sufficient temperature resistance so it is not adversely affected by the temperature of the extrudate and/or extruder die, not be substantially corroded or otherwise chemically affected by the extrudate or air, and be able to be attached to a frame or other suitable device (see below) in the apparatus. Useful materials for the wire include metals, carbon fiber and polymer fibers which are not adversely affect by the conditions of use. Preferred wires are metal (alloys), and useful metals include stainless steel, corrosion resistant alloys such as Monel® and Hastelloy®, platinum (alloys), gold (alloys), and steel, and preferred metals are stainless steel and steel. Steel, especially high tensile strength steel wire, is preferred because wires with small cross sections may be used with less chance of breakage.

The direction of movement across the exit die face and orifices is often not critical and may be up, down, diagonal (to the horizontal or vertical) or horizontal, or any combination of these, for example up and down. The configuration of the extrusion orifice(s) may affect which direction is best. For example if one has a film die whose long dimension is horizontal, it may be desirable to have the wire move horizontally along the long axis of the orifice. If the orifice(s) is(are) circular, it may make no difference in which direction the wire moves. Blown film dies are typically in a horizontal position (with the polymer exiting the die up or down), and the wire may be drawn across the face of those dies horizontally.

The wire may be used in any method which moves it across the exit face of the die to effectively remove the die drips as described herein. For instance the wire may be moved by hand across the exit face of the die by utilizing an apparatus somewhat similar to a large cheese cutter or coping saw in which the wire takes the place of saw blade (see Examples 1-3), or it may be mounted in relationship to the exit face of the die in an appropriate frame that moves the wire across the exit face and orifice(s) of the die. This frame may be mounted to the overall extruder apparatus or may be mounted independently so that it is in position to move the wire appropriately.

This frame may be moved by hand or may be moved by a mechanical device such as an electric motor. The rate of movement across the exit face may optionally be varied by adjustment of the motive force (for instance the electric motor or gears attached thereto). Assuming for instance that the motive force is an electric motor, the movement may be automated by use of a timer mechanism so that the exit face is "cleaned" at a given interval. For instance the wire may move up one time, and then down another, especially for instance if the cross section of the orifice(s) is(are) circular. The interval between "sweeps" of the wire across the exit face may set so that buildup of large amounts of die drips does not occur.

As the wire proceeds across the exit face of the extruder die it dislodges the die drips present. Some of these "particles" may then become attached to the extrudate flowing from the extrusion orifices. However, if the die drips are small enough this may not be a problem with extrudate quality. The interval between wire sweeps may also depend somewhat on how long it takes the die drip material to significantly degrade, for example thermally degrade because of the extrusion die's temperature. An optimum interval, taking into account these and other factors, will depend on the material being extruded, the configuration of the extrusion die, especially the die lips, the extrusion conditions, and other conditions, but will be readily ascertainable by minimal experimentation.

Provision may also be made to "change" the wire periodically. For example new wire may be on roll mounted on the frame which causes the wire to sweep over the exit face. There may also be a take-up roll for wire that has been used. The wire may be advanced manually, or the advance may be automated to occur at set intervals of time or after a set number of sweeps of the exit face. If the wire is moved by hand, for example in the "coping saw-like" apparatus of Example 1 the wire may be changed manually. Changing the wire is particularly useful if sweeping over the exit face causes the wire to be fouled in such a way so as to reduce its effectiveness (for example interrupt the polymer flow because there is solid on the wire) and/or cause the extruded polymer to become contaminated from material on the wire.

The wire may be heated, for example either by an external heater or an electric current passed through the wire to heat it. For this purpose an electrically resistant wire such as Nichrome® may be used.

If the die drips or other unwanted material(s) stick to the wire the wire may be cleaned instead of changed. The wire may be vibrated or tapped, or may be wiped in some way, to remove the unwanted material. A combination of cleaning and changing the wire may be used.

The great advantage of the present method is that even if it is decided that the interval between the sweeps of the wire should be relatively short, no production time is lost and there is no or virtually no wastage of the extrudate. This is because the sweep of the wire does not cause the "breakage" of the continuous "liquid" extrudate. For example video pictures of thermoplastics being extruded show that the extrudate simply flows around the wire while the wire crosses through the extrudate and the flows around the wire "reunite" after they have passed around the wire (see Example 1 and FIGS. 1-3).

A preferred material to be extruded is a thermoplastic polymer (TP) or an elastomeric polymer (EP), more preferably a TP. Useful types of thermoplastics include: poly (oxymethylene) and its copolymers; polyesters such as PET, poly(1,4-butylene terephthalate), poly(1,4-cyclohexyldimethylene terephthalate), and poly(1,3-poropyleneterephthalate); polyamides such as nylon-6,6, nylon-6, nylon-12, nylon-11, and aromatic-aliphatic copolyamides; polyolefins such as polyethylene (i.e. all forms such as low density, linear low density, high density, etc.), polypropylene, polystyrene, polystyrene/poly(phenylene oxide) blends, polycarbonates such as poly(bisphenol-A carbonate); partially fluorinated polymers such as copolymers of tetrafluoroethylene and hexafluoropropylene, poly(vinyl fluoride), and the copolymers of ethylene and vinylidene fluoride or vinyl fluoride; polysulfides such as poly(p-phenylene sulfide); polyetherketones such as poly(ether-ketones), poly(ether-ether-ketones), and poly(ether-ketone-ketones); poly(etherimides); acrylonitrile-1,3-butadinene-styrene copolymers; thermoplastic (meth)acrylic polymers such as poly(methyl methacrylate); thermoplastic elastomers such as the "block" copolyester from terephthalate, 1,4-butanediol and poly(tetramethyleneether)glycol, and a block polyolefin containing styrene and (hydrogenated) 1,3-butadiene blocks; and chlorinated polymers such as poly(vinyl chloride), vinyl chloride copolymer, and poly(vinylidene chloride).

The TPs or EPs used herein may contain materials normally found in such polymers, for example, fillers, reinforcing agents, antioxidants, pigments dyes, flame retardants, etc., in the amounts that are normally used in such compositions. However TPs or EPs containing materials whose longest dimension is quite long, such as long fiber reniforcements, may not be preferred in the present process since such large items, especially flexible ones such as fibers, may hang up in the wire. Discontinuous fibers, preferably less than 13 mm long, more preferably less than about 6.4 mm long (average size actually measured in the composition after exiting the extruder, as for instance by optical microscopy), however may be used.

A prefrred process involves the formation of particles, typically pellets or granules, of the TP composition, now practiced extensively commercialy. This is done by melting the TP in an extruder and optionally mixing in other ingredients, extruding through one or more orifices in the extruder die plate, solidifying the polymer into a strand, and then chopping/cutting the TP into particles. Typically the largest dimension of these particles is about 12 mm, often smaller. The die orifices are typically have round cross sections ands range from about 1 mm to about 6 mm in diameter. When these types of strands are cut the cut length typically averages 2 mm to about 10 mm. These pellets or granules are then typically sold for further melt processing, and they are put into hoppers where they readily flow by gravity for further processing. The use of the present apparatus for removing the die drips often results in a higher quality pellets and/or a higher quality TP (composition).

The same process may be used to granulate elastomers, although here the strand does not solidify in the sense of forming a solid, it is merely of high enough viscosity so the strand is self supporting.

Other products may be extruded (without necessarily being heated) using the apparatus as described herein to clean the die face. The same sorts of advantages seen for polymers are applicable here also. Such products include foods which are viscous and/or solidify on cooling, asphalt, adhesives (which may contain polymers) especially hot melt adhesives for instance on packaging lines, and caulks and sealants (which may also contain polymers).

EXAMPLE 1

A 0.23 mm (nominal) diameter stainless steel wire was mounted on a frame. The frame, which was bent from 32 mm thick wire was shaped like a coping saw without the blade, and had small pegs welded where the coping saw blade would be attached. The wire was wrapped around these two pegs to tautly mount it in the frame (where a coping saw blade would be). The span of the wire between the pegs was about 21.5 cm and the depth of the handle was about 12.7 cm.

A partially aromatic polyamide having repeat units derived from 1,6-hexanediamine, terephthalic acid, and adipic acid (no fillers or other ingredients except for stabilizers) was extruded from a 40 mm Werner & Pfleiderer twin screw extruder. The die with a flat exit face had two circular cross section orifices each 0.48 cm in diameter. The two orifices were lined up approximately horizontally, and the orifice holes were horizontal. The polyamide was extruded with extruder barrel temperatures of 310° C. and a die temperature of 320° C. at a rate (both orifices) of about 61 kg/hr. The horizontally held wire was wiped by hand vertically (up or down, it didn't seem to make a difference) across the exit face of the die. Although the rate of movement of the wire did not seem critical, a typical speed was about 2.4 mm/sec across the face of the die.

Figure 2:
Figure 3:
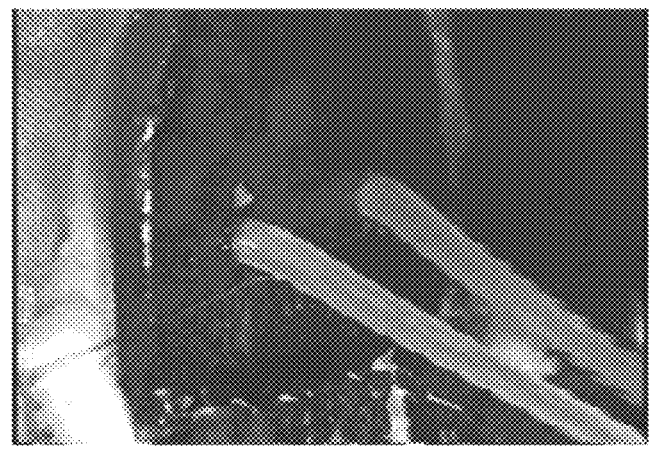

The polyamide was extruded until easily visible die drips formed and then the wire was wiped across the face of the die. FIGS. 1-3 shows a sequence of pictures of a single wipe of one orifice. FIG. 1 shows the wire (going down vertically) just before it contacted the flowing polyamide. The die drips appear as the white appearing (they are solidified) material somewhat parallel to the flowing molten polymer. FIG. 2 shows the wire in the midst of the extrudate stream. FIG. 3 shows the wire just after it exited the polymer stream. The descriptions for FIGS. 1-3 refer to the right hand polymer stream. Note that in FIG. 3 the die drip is now attached to the wire and is being carried away from the orifice and extrudate stream. Sometimes the wire dislodges the die drip and it may stick to the wire, or drop away, or become attached to the polymer stream and be carried along with the polymer.

The polyamide was being extruded into a strand to be chopped. When the wire was moved through the polyamide stream the strands were not broken or interrupted. As can be seen in FIG. 2, the polyamide simply flowed around the wire and the flows rejoined on the downstream side of the wire.

EXAMPLES 2

In this Example the die used as similar to that used in Example 1, i.e., it had two circular holes 0.48 cm in diameter. The extruder was a 30 mm Werner & Pfleiderer twin screw extruder. The composition extruded was Rynite® 530, a poly (ethylene terephthalate) containing 30 weight percent of chopped glass fiber and minor amounts of other materials (stabilizers, crystallization promoters, etc.) available from E.I. DuPont de Nemours & Co., Inc. Wilmington, Del. 19898, USA. The composition was dried under manufacturer recommended conditions before use. The extruder barrels and die were set at 310° C., and the composition was extruded at an approximate rate (total of both holes) of 18 kg/h.

The wire used was mounted as described in Example 1. It was a stainless steel wire with a diameter of 0.13 mm. It was passed vertically (up and down) or horizontally through the polymer streams as described in Example 1 and successfully removed the die drips without interrupting the polymer flow. However if the wire were passed too rapidly through the polymer stream the polymer flow was interrupted, so slower "traverse speeds" were desirable. A typical useful speed was about 3.1 mm/sec across the face of the die. It was noticed on video of these wipes that a section of the polymer composition stream sometimes separated from the main polymer stream. When a stainless steel wire with a 0.23 mm diameter was used the flow of the polymer stream was more "disturbed" but the wiping could still be done without interrupting the polymer stream.

EXAMPLE 3

The same conditions were used as in Example 2 with the 0.13 mm diameter wire except the barrel and die temperatures were 330° C., and the polymer composition used was Zenite® HX6130, a liquid crystalline polyester polymer containing 30 weight percent chopped glass fiber, available from E.I. DuPont de Nemours & Co., Inc., Wilmington, Del. 19898, USA. Again when the wire was passed through the polymer streams vertically (up and down) or horizontally it smoothly removed the die drips without interruption of the polymer streams.

The invention claimed is:

1. A process for cleaning a die of an extruder,
the extruder having
   a die out of which polymer extrudate flows and
      having
         an exit face and one or more extrusion orifices, each
            orifice having a cross section;
      and
   a rigid wire having
      a diameter that is no more than 20 percent of the
         maximum dimension of the cross section of any of
         the one or more extrusion orifices,
wherein the rigid wire:
is in the vicinity of and oriented in a plane parallel to the
   exit face of the die and parallel to the one or more
   extrusion orifices,
   the process comprising:
      moving a wire across the exit face of the die and the one
         or more extrusion orifices of said die thereby dislodging polymer extrudate from the exit face without
         breakage of, or interruption of, the polymer extrudate
         flowing out of the die.

2. The process as recited in claim 1 wherein said wire is a metallic wire.

3. The process as recited in claim 1 wherein said moving takes place at predetermined intervals.

4. The process as recited in claim 3 wherein said moving is automated.

5. The process as recited in claim 1, further comprising changing the wire at predetermined intervals.

6. The process as recited in claim 5 wherein said changing is automated.

7. A process for the extrusion of a substance, comprising:
providing an extruder having
a die out of which polymer extrudate flows and having an exit face and one or more extrusion orifices,
and
a rigid wire having a diameter that is no more than 20 percent of the maximum dimension of the cross section of any of the one or more extrusion orifices
wherein the rigid wire is in the vicinity of and oriented in a plane parallel to the exit face of the die and parallel to the one or more extrusion orifices
moving a wire across the exit face of the die and the one or more extrusion orifices of said die thereby dislodging polymer extrudate from the exit face without breakage of, or interruption of, the polymer extrudate flowing out of the die.

8. The process as recited in claim 7 wherein said wire is a metallic wire.

9. The process as recited in claim 7 wherein said moving takes place at predetermined intervals.

10. The process as recited in claim 9 wherein said moving is automated.

11. The process as recited in claim 7, further comprising changing the wire.

12. The process as recited in claim 11 wherein said changing is automated.

13. The process as recited in claim 7 wherein said wire is less than the dimension selected from the group consisting of about 0.15 mm thick and 10% of the maximum dimension of a cross section of extruded substance.

14. The process as recited in claim 7 wherein said substance comprises a thermoplastic polymer or elastomeric polymer.

15. The process as described in claim 14 wherein said substance additionally comprises one or more of a filler, reinforcing agent, antioxidant, pigment, dyes, or flame retardant.

16. The process as recited in claim 14 wherein said substance comprises said thermoplastic polymer and particles of said substance are produced.

17. An apparatus, comprising:
an extruder having
a die out of which polymer extrudate flows and having
an exit face and
one or more extrusion orifices,
each orifice having a cross section;
and
a rigid wire having
a diameter that is no more than 20 percent of the maximum dimension of the cross section of any of the one or more extusion orifices,
wherein the rigid wire:
is in the vicinity of and oriented in a plane parallel to the exit face of the die and parallel to the one or more extrusion orifices;
moves across the exit face of the die and through polymer extrudate flow; and
dislodges extrudate from the exit face without breakage of the polymer extrudate flowing out of the die or interruption of polymer extrudate flow.

18. The apparatus as recited in claim 17 wherein said wire is a metallic wire.

19. The apparatus as recited in claim 17 wherein said moving is automated, and takes place a predetermined intervals.

20. The process as recited in claim 5, wherein said changing is automated and is done at predetermined intervals.

\* \* \* \* \*